US006618794B1

(12) United States Patent
Sicola et al.

(10) Patent No.: US 6,618,794 B1
(45) Date of Patent: Sep. 9, 2003

(54) SYSTEM FOR GENERATING A POINT-IN-TIME COPY OF DATA IN A DATA STORAGE SYSTEM

(75) Inventors: Stephen J. Sicola, Colorado Springs, CO (US); James Pherson, Colorado Springs, CO (US); Jesse Yandell, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/702,575

(22) Filed: Oct. 31, 2000

(51) Int. Cl.[7] .................................................. G06F 11/00
(52) U.S. Cl. ........................ 711/154; 711/114; 711/161; 711/162; 714/6; 714/15; 714/20; 707/201; 707/202; 707/203; 707/204
(58) Field of Search ................................. 711/154, 162, 711/161, 114; 714/6, 15, 20; 707/201, 202, 203, 204

(56) References Cited

U.S. PATENT DOCUMENTS

| | | | | |
|---|---|---|---|---|
| 5,089,958 A | * | 2/1992 | Horton et al. ................... 714/5 |
| 5,170,347 A | * | 12/1992 | Tuy et al. ..................... 345/419 |
| 5,263,154 A | * | 11/1993 | Eastridge et al. ............... 714/6 |
| 5,619,675 A | * | 4/1997 | De Martine et al. ........ 711/133 |
| 5,819,292 A | * | 10/1998 | Hitz et al. ................... 707/203 |
| 6,016,553 A | * | 1/2000 | Schneider et al. ............. 714/21 |
| RE37,038 E | * | 1/2001 | Eastridge et al. ............... 714/5 |
| 6,199,178 B1 | * | 3/2001 | Schneider et al. ............. 714/21 |
| 6,219,770 B1 | * | 4/2001 | Landau ......................... 711/162 |
| 6,240,527 B1 | * | 5/2001 | Schneider et al. ............. 714/21 |
| 6,434,681 B1 | * | 8/2002 | Armangau ................... 711/162 |
| 6,446,175 B1 | * | 9/2002 | West et al. ................... 711/162 |
| 6,473,775 B1 | * | 10/2002 | Kusters et al. ............... 707/200 |
| 6,510,491 B1 | * | 1/2003 | Franklin et al. ............. 711/114 |

* cited by examiner

Primary Examiner—Matthew Kim
Assistant Examiner—Stephen Elmore

(57) ABSTRACT

A system for generating a virtual point-in-time copy of a selected subset (e.g., a selected volume or logical unit) of a storage system. The present system operates by using a bitmap in storage system controller cache memory to indicate blocks of memory in the selected volume that have been overwritten since the snapshot was initiated. When a write to the selected volume is requested, the cache bitmap is checked to determine whether the original data (in the area to be overwritten) has already been copied from the selected volume to a temporary volume. If the original data was previously copied, then the write proceeds to the selected volume. If, however, the original data would be overwritten by the presently requested write operation, then an area containing the original data is copied from the selected volume to a temporary volume. Reads from the temporary volume first check the bitmap to determine if the requested data has already been copied from the selected volume to the temporary volume. If so, the data is read from the temporary volume, otherwise, the data is read from the selected volume.

20 Claims, 4 Drawing Sheets

SYSTEM FOR GENERATING A POINT-IN-TIME COPY OF DATA IN A DATA STORAGE SYSTEM

BACKGROUND OF THE INVENTION

Technical Field

The present invention relates generally to data backup methods, and more particularly, to a system for providing a point-in-time backup copy of data stored in a data storage system.

STATEMENT OF THE PROBLEM

Typically, in order to provide a point-in-time copy of data stored in a data storage system, all I/O operations to the data storage volume must be stopped and data in the host cache and any other cache in the path to the device must be flushed/copied. A copy of the entire data range of interest (typically a volume or logical unit) is then made to a backup device, and I/O to the storage system is finally resumed when the backup is complete. Alternatively, if the data to be copied resides on a mirror set (such as a two-member RAID 1 set), the set is temporarily broken, I/O resumes on the remaining member and the copy is then made to the backup device. When the copy is complete, the copy member is added back to the set and made consistent with the remaining members (a complete copy is typically required). However, the first of these backup techniques requires that the application not operate for the duration of the backup and the latter technique reduces the reliability of the data while the backup copy is being made. Furthermore, breaking the mirror set while making a copy also has the drawback of requiring additional time to restore the system to an operational mirror set while the (copied) member of the mirror set is re-merged to bring it up-to-date with I/O transactions which occurred (with its partner) during the copy process.

SOLUTION TO THE PROBLEM

The present invention overcomes the aforementioned problems of the prior art and achieves an advance in the field by providing a system which allows I/O operations directed to a storage system to proceed in an uninterrupted or briefly paused manner while generating a point-in-time virtual copy (a 'snapshot') of a selected subset (e.g., a selected volume or logical unit) of the storage system. The system of the present invention operates by using a bitmap in storage system controller cache memory to indicate blocks of memory in the selected volume (e.g., logical unit [LUN] X), that have been overwritten since the snapshot was initiated. When a write to LUN X is requested, the cache bitmap is checked to determine whether the original data (in the area to be overwritten) has already been copied from LUN X to a temporary volume that is the same size or larger than LUN X, hereinafter referred to as 'LUN Y'. If the original data was previously copied, then the write proceeds to LUN X. If, however, the original data would be overwritten by the presently requested write operation, then an area containing the original data is first copied from LUN X to LUN Y. Reads from LUN Y check the bitmap to determine if the requested data has already been copied from LUN X (to LUN Y). If so, the data is read from LUN Y; if not already copied, the data is read from LUN X.

In contrast to the prior art, the system of the present invention provides uninterrupted or briefly interrupted access to the primary volume (LUN X), while providing a level of protection for the data stored thereon that is not reduced as a result of the copy operation. Furthermore, the present system creates the point-in-time 'copy' requiring only very small incremental amounts of time, since a copy of only a small subset of the selected volume is made in response to the first write directed to that subset. In addition, no time is required to re-merge the members of a mirror set, since the present system never 'breaks' the set to make the point-in-time copy.

It should be noted that there is no reason that the storage controller requires an interruption of access to the unit. If I/O is not interrupted a "crash consistent copy" will be created; that is, when the 'snapshot' copy command is issued, I/O operations that were in progress may have some, none, or all of the data on the snapshot. The requesting application, however may require that all I/O is in a known state before initiating the snapshot, in which case the copy operation may take a couple of seconds to insure that cache is flushed at the host.

DETAILED DESCRIPTION

Figure 1:
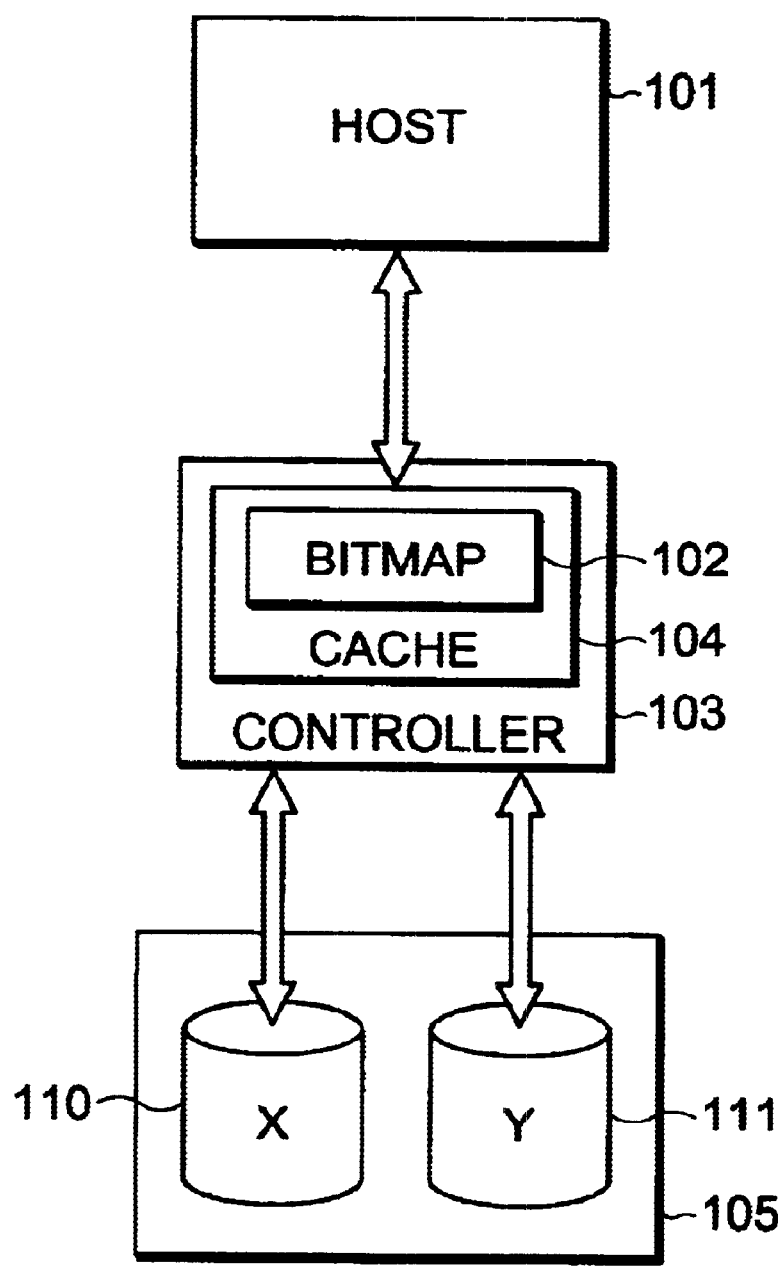
FIG. 1 is a diagram illustrating interrelationships between elements utilized in practicing the system of the present invention.

FIG. 1 is a diagram illustrating interrelationships between elements utilized in practicing the system of the present invention. The present system creates a point-in-time virtual copy (hereinafter called a 'snapshot') of a selected volume (hereinafter referred to as logical unit X, or LUN X) 110 on a storage subsystem 105, as shown in FIG. 1. The 'copy' created by the present system is essentially a 'virtual copy' of the selected volume because all of the data comprising the selected volume is not necessarily copied to a backup volume. Instead, only those areas of the selected volume that have been overwritten (partially or totally) since the snapshot was initiated are actually copied to the temporary backup volume (hereinafter referred to as logical unit Y, or LUN Y). Controller 103 presents virtual units X and Y to host 101, and in some circumstances (as explained in detail below), presents data on LUN X as if it were part of the 'virtual copy' which host 101 assumes is located on LUN Y.

In operation, temporary volume 111 (LUN Y) is created on storage subsystem 105. LUN Y is of sufficient size to store all areas of data that may be overwritten on LUN X after the time of snapshot creation, and therefore, must be at least as large as LUN X. Controller 103 manages requests from host processor 101 for I/O operations directed to storage subsystem 105. A bitmap 102 in cache memory 104 of controller 103 is used to indicate blocks of memory in LUN X that have been overwritten (i.e., written to) since the snapshot was initiated.

When a write to LUN X is requested by host 101, controller 103 checks the cache bitmap 102 to determine whether the original data (in the area to be overwritten) has already been copied from LUN X to LUN Y. If the original data was previously copied, then the write proceeds to LUN X. If, however, the original data would be overwritten by the presently requested write operation, then an area containing the original data is copied from LUN X to LUN Y. A write request to LUN Y is handled in the same manner as a write request to LUN X, since a check of bitmap 102 must also be made in this situation to determine whether the original data has been copied over to LUN Y before data is written thereto.

When a read is requested from LUN Y, bitmap 102 is checked to determine if the requested data has already been copied from LUN X (to LUN Y). If so, the data is read from LUN Y, otherwise, the original data is read from LUN X, since it has not been overwritten since the snapshot was initiated. A read from LUN X is handled in a normal manner (i.e., directed to LUN X) without an intervening check of bitmap 102.

Figure 2:
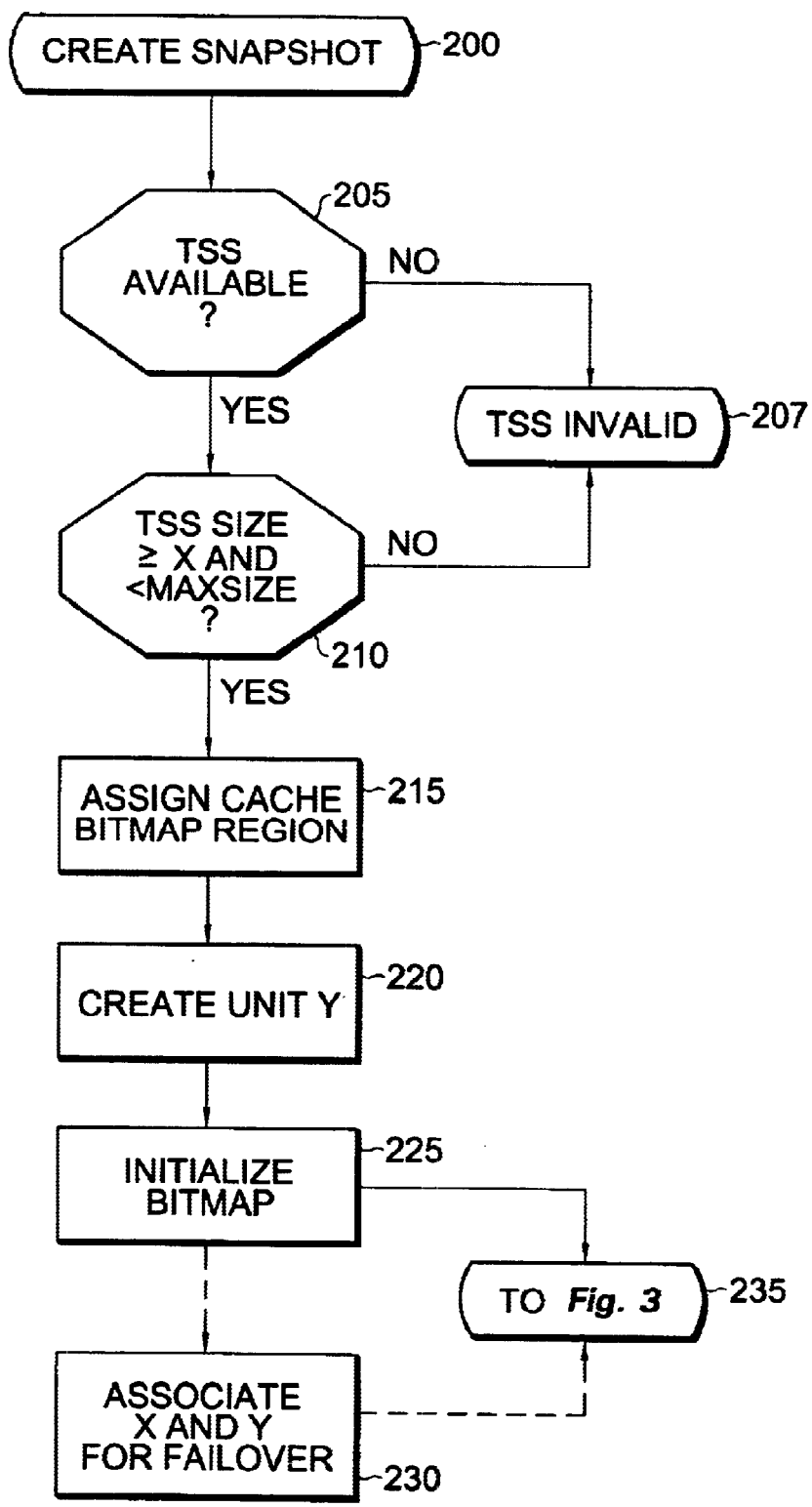
FIG. 2 is a flowchart showing initial steps performed in the creation of a 'snapshot' copy of data on a storage system.

FIG. 2 is a flowchart comprising initial steps which may be performed in the creation of a 'snapshot' copy of data stored on storage subsystem 105. As shown in FIG. 2, at step 200, in response to a request from a user, host 101 issues a 'create snapshot' command to controller 103. In an exemplary embodiment of the present system, the 'create snapshot' command includes parameters indicating:

(1) the volume for which the snapshot is to be made (LUN X in all examples herein);

(2) the temporary volume to be created (LUN Y in the present examples); and (3) the temporary storage set that is used to create LUN Y.

Controller 103 then makes a series of checks to determine whether the requested snapshot can be created. Prior to performing the steps shown in FIG. 2, it is desirable to insure that all queued I/O operations for LUN X are completed. This may be accomplished by halting I/O from host 101 to LUN X, or by executing a command appropriate to the particular controller 103 managing operation of the present system. In any event, the steps shown in the accompanying FIG. 2 are performed by controller 103, or by some other processor-controlled entity connected between host 101 and storage subsystem 105, that has access to cache memory 104.

At step 205, a verification is made that the temporary storage set requested is available. If unavailable, a response that the requested temporary storage set ('TSS') is invalid is returned to host 101. The temporary storage set typically comprises storage space on one or more disk drives which may be presented to host 101 as a volume or logical unit (LUN). If such a storage set is available, then, at step 210, the size of the requested temporary storage set is checked to verify that it is equal or greater than LUN X, and less than a predetermined maximum size. In one embodiment of the present system, the maximum snapshot size is 512 GB. If the size of the requested temporary storage set is not within acceptable bounds, a response that the temporary storage set is invalid is returned to host 101.

At step 215, a region in controller cache 104 is assigned for use as a bitmap 102 for indicating areas of LUN X that have been overwritten (or written to) since a snapshot was initiated. In an exemplary embodiment of the present system, each bit in bitmap 102 represents a 'superblock', or group of 128 blocks of storage space. Alternatively, the granularity of bit map 102 may be chosen such that one bit therein represents an amount of storage other than 128 blocks. At step 220, LUN Y is created using the temporary storage set parameters supplied with the 'create snapshot' command. Next, at step 225, bitmap 102 is initialized with all bits set to 'ones'. Each time data is copied from LUN X to LUN Y, a bit representing the area of copied data is cleared, or zeroed. More specifically, a zeroed bit represents the superblock in which the block or blocks of original data were located on LUN X, prior to being overwritten on LUN X and copied to LUN Y. At step 235, host I/O to LUN X is then resumed, and system operation in 'snapshot' mode commences, as described in detail with respect to FIG. 3, below. Optionally, an association between LUNs X and Y may be established for failover purposes (to force concurrent failover), at step 230.

Figure 3:
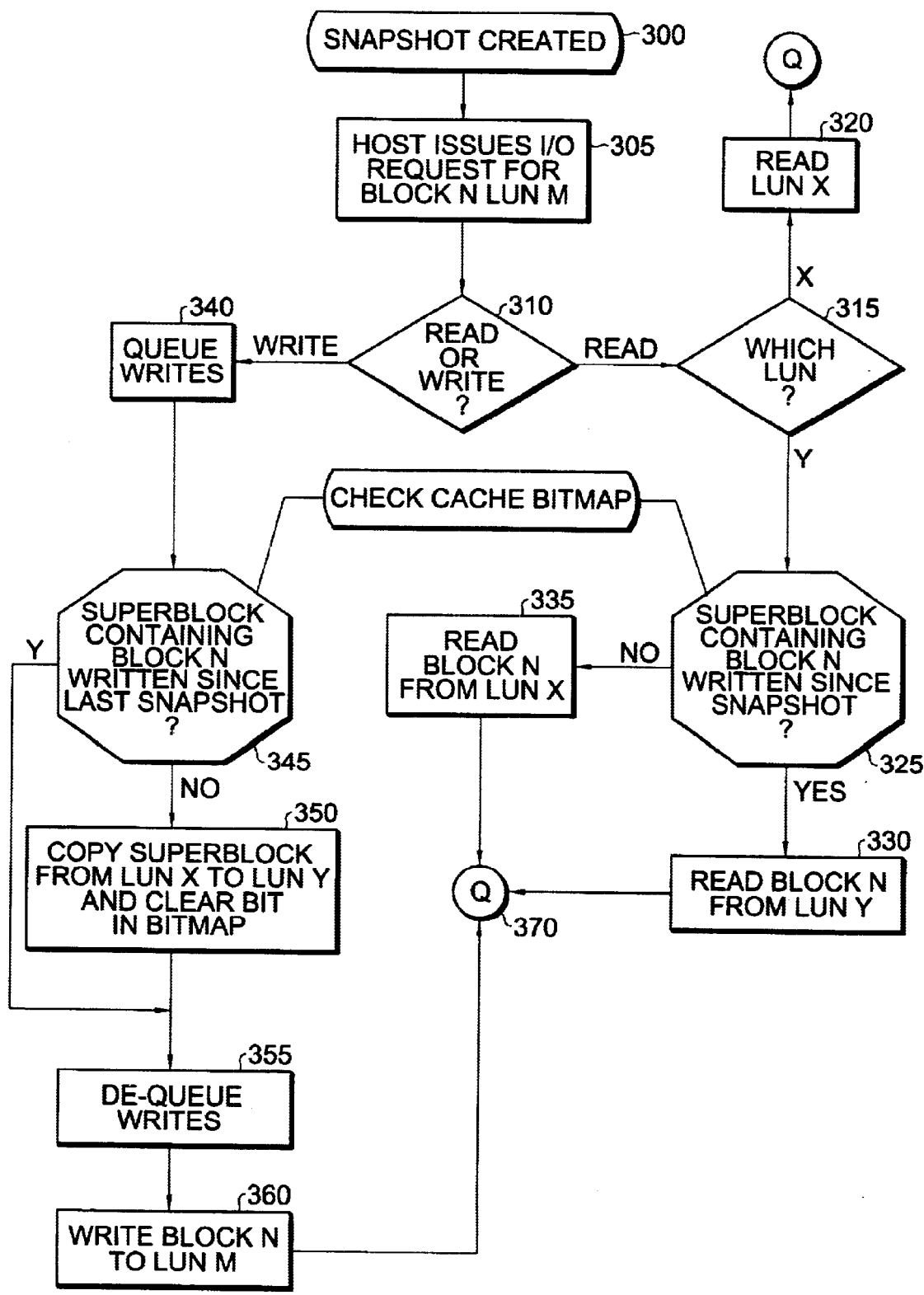
FIG. 3 is a flowchart illustrating operational aspects of the present system.

FIG. 3 is a flowchart illustrating operational aspects of the present system. As shown in FIG. 3, the point-in-time copy of LUN X, i.e., the 'snapshot'of LUN X is created at step 300, as described above with respect to FIG. 2. Subsequently, in an exemplary embodiment of the present system, when host 101 issues a read or write request directed to either LUN X or LUN Y, at step 305, the appropriate steps in FIG. 3 are performed as described below.

Write Operation

Initially, at step 310, if a write operation is requested by host 101, then at step 340, all writes to LUN X are briefly queued while the next one or two steps (step 345 and possibly step 350) are performed. These steps execute quickly, so that the paused writes to LUN X are transparent to the requesting application executing on host 101. At step 345, a check of bitmap 102 is made to determine whether the superblock containing block N has already been written from LUN X to LUN Y since the current snapshot was initiated.

Figure 4:
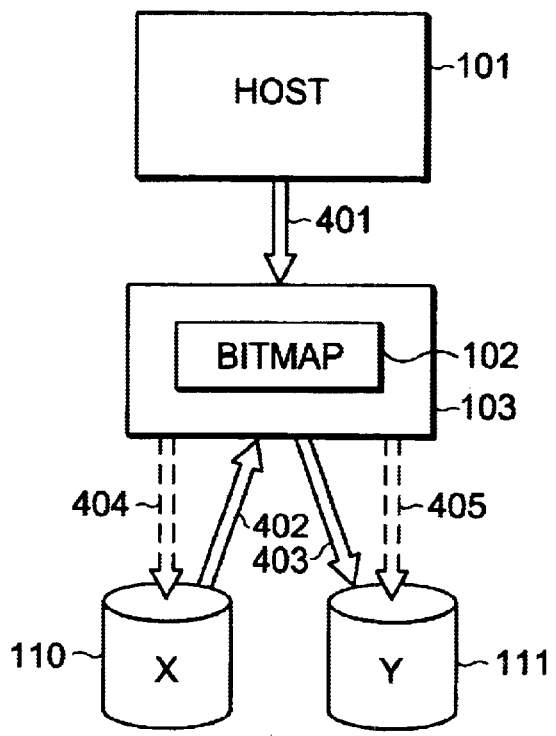
FIG. 4 is a diagram showing data flow during a write operation.

FIG. 4 is a diagram showing data flow as a result of a request 401 by host 101 to write block N of data to storage subsystem 105. The operation of the present system is best understood by viewing FIGS. 3 and 4 in conjunction with one another. Table 1, below, shows the partial contents of LUNs X and Y immediately after snapshot initiation, prior to any write operations to either LUN X or LUN Y. In Table 1 (and also in Table 2), below, each block that is not overwritten in LUN X is shown as containing all '4's, and each block in LUN Y initially contains all 'X's, which represent 'don't care' data values. For the purpose of clarity, in the following tables, a superblock is equal in size to a single block; therefore, each bit in bitmap 102 represents one block of storage space in storage subsystem 105.

TABLE 1

|         | LUN X | LUN Y | Bitmap |
|---------|-------|-------|--------|
| Block 0 | 44444 | XXXXX | 1      |
| Block 1 | 44444 | XXXXX | 1      |
| Block 2 | 44444 | XXXXX | 1      |

Note that, at this point, a copy of LUN X is not actually made to LUN Y. Since controller 103 presents LUNs X and Y to host 101 as virtual units, the method of the present invention allows data on LUN X to be presented to host 101 as if the data were actually present on LUN Y. However, as discussed below, data is not copied from LUN X to LUN Y until immediately before (an area containing) the data is overwritten on LUN X.

If, at step 345, it was determined (from bitmap 102) that the superblock containing block N has not been written from LUN X to LUN Y since snapshot initiation, then, at step 350, the superblock containing block N is copied from LUN X to LUN Y (as shown by arrows 402 and 403 in FIG. 4), and the bit representing that particular superblock in bitmap 102 is cleared (zeroed). The queued write operations to LUN X are then dequeued at step 355, and, at step 360, block N is written to the appropriate volume, indicated by arrows 404/405.

Table 2 shows the partial contents of LUNs X and Y subsequent to a write (of all '5's) to block 1 of LUN X. Note that block 1 of LUN Y contains the block of '4's that were copied over from LUN X prior to the write operation (to LUN X). Bitmap 102 contains a zero in the block 1 position indicating that the block has been copied to LUN Y and overwritten on LUN X.

TABLE 2

|         | LUN X | LUN Y | Bitmap |
|---------|-------|-------|--------|
| Block 0 | 44444 | XXXXX | 1      |
| Block 1 | 55555 | 44444 | 0      |
| Block 2 | 44444 | XXXXX | 1      |

If, at step 345, it was determined (from bitmap 102) that the superblock containing block N has already been written from LUN X to LUN Y, then, at step 355, write operations to LUN X are resumed, and, at step 360, block N is written to the appropriate volume (LUN X or LUN Y, depending on the particular I/O request). Operation of the present system is then quiescent, at step 370, until a subsequent I/O request from host 101 directed to LUN X causes processing to resume at step 305.

Read Operation

If, at step 310, if a read (block N) operation is requested, then at step 315, the actual volume to be read is determined. All reads directed to LUN X proceed normally, as indicated at step 320. However, a read from LUN Y requires a check of bitmap 102, at step 325, to determine whether the superblock containing block N has already been written from LUN X to LUN Y since the current snapshot was initiated.

Figure 5:
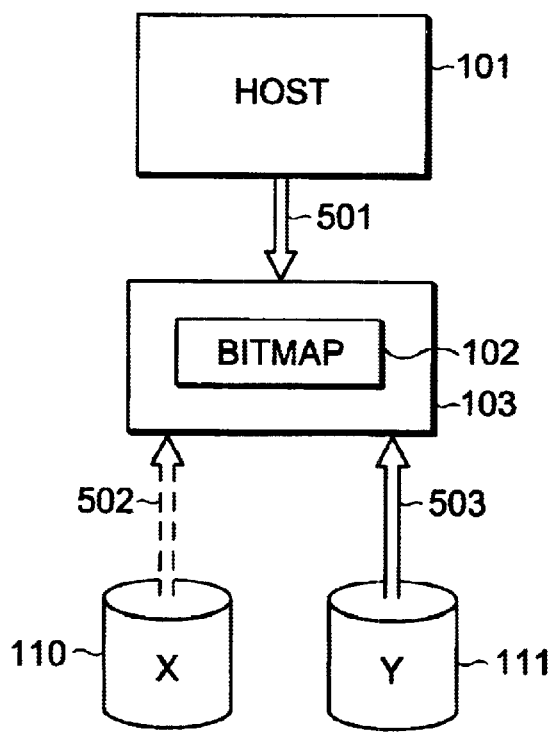
FIG. 5 is a diagram showing data flow during a read operation.

FIG. 5 is a diagram showing data flow as a result of a request 501 to read block N from storage subsystem 105. If bitmap 102 indicates (at step 325) that the superblock containing block N has already been written from LUN X to LUN Y, then at step 330, block N is read from LUN Y (indicated by arrow 503 in FIG. 5). Otherwise, at step 335 block N is read from LUN X (as indicated by arrow 502 in FIG. 5), since block N has not been copied to LUN Y at this point. For example, as shown in Table 2, a request for the 'snapshot' of data in block 0 or block 2 (of in any other non-overwritten block) will be directed to LUN X, because the data in those blocks has not been overwritten since the snap shot was initiated. In this situation, the data from LUN X is presented by controller 103 to host 101 as being from LUN Y, even though it was read from LUN X.

In fact, absent a prior write operation to the superblock containing block N on LUN X, this data (i.e., the superblock) may never have to be copied (from LUN X to LUN Y) during the lifetime of the snapshot. This feature allows the present invention to be considerably more efficient than prior art methods which require copying of the entire contents of LUN X to other storage space, regardless of subsequent I/O activity.

While preferred embodiments of the present invention have been shown in the drawings and described above, it will be apparent to one skilled in the art that various embodiments of the present invention are possible. For example, the specific block granularity represented by each bit in bitmap 102, and the size of the corresponding data block(s) copied to the temporary unit (e.g., LUN Y) as a result of a write to the selected unit (e.g., LUN X) should not be construed so as to limit the embodiments described herein. Furthermore, the mechanism for determining whether particular areas of the selected unit have been overwritten or copied to the temporary unit does not necessarily have to be a bitmap in cache memory, but rather, can be any mechanism or method known in the art for storing event-related indicia. For example, a lookup table, or other indicating mechanism, in either volatile or non-volatile memory accessible to the controller or processor managing the operation of the present system could be employed in lieu of bitmap 102. In addition, the temporary unit (e.g., LUN Y) does not have to be located on the same physical subsystem as the selected unit (e.g., LUN X); for example, a Storage Area Network may provide a suitable temporary storage resource at a remote location. It is to be understood that modification may be made to these and other specific elements of the invention without departing from its spirit and scope as expressed in the following claims.

We claim:

1. A method for creating a point-in-time virtual copy of a selected volume of a data storage system, the method comprising the steps of:

initializing, to an initial value, a plurality of indicia, each of which represents an area in the selected volume;

in response to receiving a write request to write new data to said selected volume, performing steps including:

determining if a target instance of said indicia, representing said area in which said new data is to be written, is set to said initial value;

if said target instance of said indicia is set to said initial value, then:

copying, to a temporary volume, said area in which said new data is to be written;

resetting said indicia representing said area to a non-initial value; and writing said new data to said selected volume.

2. The method of claim 1, further including, in response to receiving a read request to read original data from said temporary volume, the steps of:

determining if an object instance of said indicia, representing said area from which said original data is to be read, is set to said initial value;

presenting said original data from said temporary volume if said object instance of said indicia is reset to said non-initial value; otherwise, presenting said original data from said selected volume if said object instance of said indicia is set to said initial value.

3. The method of claim 2, wherein said plurality of indicia is a bitmap.

4. The method of claim 3, wherein each bit in said bitmap represents a group of blocks of said original data.

5. The method of claim 3, wherein said bitmap is located in memory accessible to a controller that manages said read requests and said write requests.

6. The method of claim 2, wherein said selected volume and said temporary volume are presented as virtual logical units to a host processor that issues said write requests and said write requests.

7. A method for reading data from a point-in-time virtual copy of a selected volume of a data storage system, subsequent to a request for creating the virtual copy, the method comprising the steps of:

determining, from indicia stored in memory, whether an area containing said data in the selected volume has been overwritten;

reading said area from a temporary volume if said area has been overwritten; otherwise, reading said data from said selected volume if said area has not been overwritten.

8. The method of claim 7, wherein said indicia is a bitmap, each bit therein representing a group of blocks of said data.

9. The method of claim 8, including the additional steps of:

copying areas of said selected volume to said temporary volume prior to being overwritten on said selected volume; and presenting said selected volume and said temporary volume as virtual logical units to a host processor that issued the request for creating said virtual copy.

10. The method of claim 9, wherein said bitmap is located in memory accessible to a controller that manages requests, from said host processor, to read said data.

11. The method of claim 9, wherein said selected volume and said temporary volume are presented as virtual logical units to a host processor that issues said write requests and said write requests.

12. A method for creating, in response to an initiating request, a point-in-time virtual copy of a selected volume of a data storage system, the method comprising the steps of:

in response to receiving a request to write new data to said selected volume, performing steps including:

determining, from indicia stored in a bitmap in memory accessible to a controller coupled to the data storage system, whether an area to which said new data is to be written has been overwritten subsequent to said initiating request;

copying said area to a temporary volume if said area has been overwritten; and writing said new data to said selected volume.

13. The method of claim 12, further including, in response to receiving a request to read original data from said temporary volume, performing the steps of:

determining, from said indicia stored in said bitmap, whether an area containing said original data has been overwritten subsequent to said initiating request;

reading said original data from said temporary volume if said area containing said original data has been overwritten; otherwise, reading said data from said selected volume if said area containing said original data has not been overwritten.

14. The method of claim 13, wherein said selected volume and said temporary volume are presented as virtual logical units to a host processor that issues I/O requests directed to said virtual copy.

15. The method of claim 13, wherein said bitmap is located in memory accessible to a controller that manages requests, from said host processor, to read said data.

16. A system for creating a point-in-time virtual copy of a selected volume of a data storage system, the system comprising:

a plurality of indicia, stored in cache memory in a controller coupled to the data storage system, wherein each of said indicia represents an area in the selected volume;

means for determining, in response to a request to write new data to a said area in the selected volume, if said indicia representative of said area corresponding to said new data is set to an initial value; and means, responsive to said means for determining, for creating a temporary volume for storing a copy of said area in which said new data is to be written.

17. The system of claim 16, wherein said plurality of indicia is a bitmap.

18. The system of claim 17, wherein each bit in said bitmap represents a group of blocks of said original data.

19. The system of claim 18, wherein said bitmap is located in memory accessible to said controller.

20. The system of claim 16, wherein said selected volume and said temporary volume are presented as virtual logical units to a host processor that issues said write requests and said write requests.

* * * * *